April 28, 1925.

F. G. HENRY 1,535,665

MACHINE FOR SHARPENING BLADES

Filed Aug. 30, 1920

INVENTOR
Ferdinand G. Henry
BY
Newell and Spencer
ATTORNEYS

April 28, 1925.  
F. G. HENRY  
MACHINE FOR SHARPENING BLADES  
Filed Aug. 30, 1920  
1,535,665  
5 Sheets-Sheet 3

INVENTOR  
Ferdinand G. Henry  
BY Newell and Spencer  
ATTORNEYS

April 28, 1925.

F. G. HENRY

1,535,665

MACHINE FOR SHARPENING BLADES

Filed Aug. 30, 1920 5 Sheets-Sheet 4

INVENTOR
Ferdinand G. Henry
BY
Newell
ATTORNEYS

Patented Apr. 28, 1925.

1,535,665

UNITED STATES PATENT OFFICE.

FERDINAND G. HENRY, OF NEW YORK, N. Y., ASSIGNOR, BY MESNE ASSIGNMENTS, TO WALDEN KNIFE COMPANY, OF WALDEN, NEW YORK, A CORPORATION OF NEW YORK.

MACHINE FOR SHARPENING BLADES.

Application filed August 30, 1920. Serial No. 406,896.

*To all whom it may concern:*

Be it known that I, FERDINAND G. HENRY, a citizen of the United States, residing at New York, N. Y., have invented certain new and useful Improvements in Machines for Sharpening Blades, of which the following is a clear, full, and exact description.

This invention relates to machines for sharpening blades, and more particularly to machines for honing the edges of the thin removable blades used in certain kinds of safety razors. Certain features of the invention, however, are not limited to honing machines but may be embodied in machines for performing other sharpening operations on blades, and certain features of the invention may be applied to machines for sharpening other kinds of blades.

One object of the present invention is to improve, in machines of this class, the construction and mode of operation of the means for handling the blades to present the same to the blade sharpening means.

In accordance with this object, certain features of the invention relate to an improved movable blade holder, and certain features to improved means for actuating the blade holder to present the blades to the blade sharpening means.

Another object of the invention is to produce a blade sharpening machine which will operate to take a series of blades in succession from a blade supplying device, present the blades to the blade sharpening means, and after the completion of the sharpening operation deliver the blades to a receiving device practically without attention on the part of the operator and which has a novel construction and arrangement of parts whereby the blades are easily and conveniently handled and the sharpening operation is performed in an improved and highly efficient manner.

With these and other objects in view, the invention comprises certain novel and improved features, construction and combination of parts hereinafter described and particularly pointed out in the claims, the advantages of which will be readily understood and appreciated by those skilled in the art.

The features of the invention will be clearly understood from the accompanying drawings illustrating a machine embodying the invention in its preferred form, and the following detailed description of the constructions therein shown.

In the present embodiment of the invention, the blade sharpening means consists of a honing disc or wheel 2 secured to a shaft 4 mounted to rotate in suitable bearings on the frame of the machine and driven by means of a belt 6 from a pulley 8 secured to the shaft 10 which constitutes the main driving shaft of the machine.

Figures 4, 5:
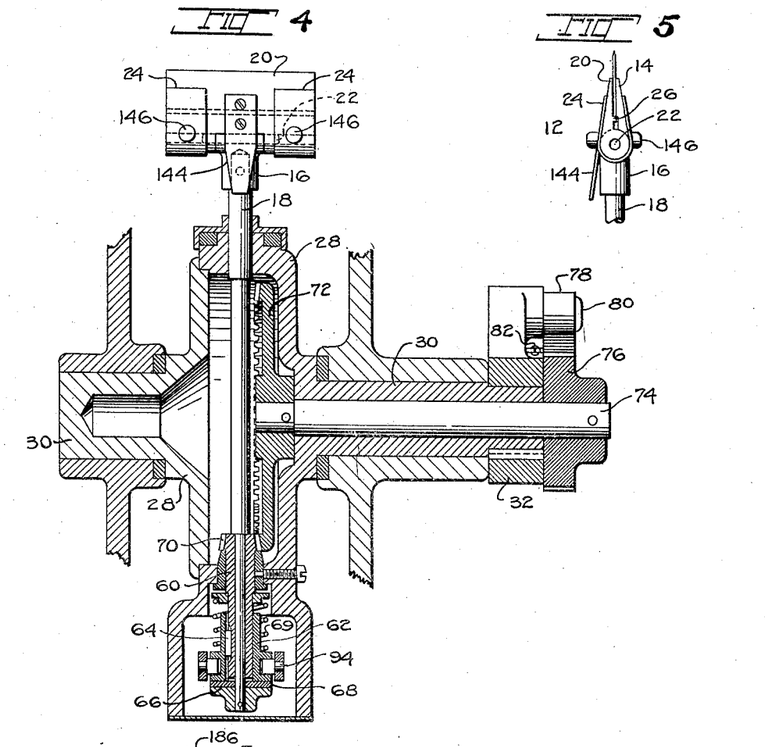
Fig. 4 is a sectional view of a portion of the machine taken substantially on the line 4—4 of Fig. 6.
Fig. 5 is a view in side elevation of a portion of the mechanism shown in Fig. 4.

In the machine illustrated in the drawing, the blades are held during the honing operation in a movable blade holder indicated as a whole at 12. The blade holder is provided with a fixed blade gripping jaw 14 formed on a block 16 secured to the upper end of a shaft 18, and with a movable blade gripping jaw 20 pivoted at 22 on the block 16. The movable jaw 20 is acted upon by leaf springs 24 embracing the jaws which tend to close the movable jaw, the movement of said jaw being limited by a stop 26. The razor blades are clamped between the jaws of the blade holder, as shown in Fig. 5.

The blade holder of the present machine is mounted so that it may be oscillated about a fixed axis to engage the blades with and disengage the same from the honing wheel. To this end the shaft 18 is mounted in a pivoted carriage 28 having bearing studs or trunnions 30 engaging in suitable bearings in the frame of the machine. When in blade receiving position the blade holder occupies the position shown in dot and dash lines in Fig. 6. After receiving a blade between the blade gripping jaws, the blade holder is preferably actuated to present each side of the blade a plurality of times to the honing wheel 2 and is then swung back to its initial position, the blade holder being reversed after each presentation of the blade to the honing wheel. In initially presenting the blade to the honing wheel, the blade holder is swung from the position shown in dot and dash lines, Fig. 6, into the position shown in Fig. 2 and in full lines in Fig. 6. After one side of the blade has been acted upon by the honing wheel, the blade holder is swung back to the position shown in dot and dash lines, Fig. 6, the blade holder is reversed, and the holder is then swung back to the position shown in full lines in this figure to present the opposite side of the blade to the honing wheel. This cycle of operations is repeated until each side of the blade has been acted upon a plurality of times by the honing wheel, thereby ensuring the formation of a satisfactory sharp cutting edge on the blade. After the completion of the sharpening operation the blade holder is again swung back to its initial or starting position and is held in this position while the honed blade is removed from the blade holder and another blade is inserted therein. In the construction shown in the drawing, the blade holder is actuated to present each side of the blade twice to the honing wheel. The blade holder is actuated to swing the same toward and from the honing wheel by swinging movements imparted to the pivoted carriage 28. The mechanism for imparting these swinging movements to the carriage comprises an arm 32 secured to one of the trunnions 30 of the carriage, (see Fig. 7) a link 34 and a rod 36 pivotally connected at its upper end with the link. The lower end of the rod 36, which is somewhat enlarged, is slidably engaged in a guide bore in a cylindrical block 38 (see Fig. 1), which in turn engages in a guideway in the frame of the machine. A coiled spring 40 is interposed between the lower end of the rod 36 and the end of the guideway in the block 38 to allow the rod to yield relatively to the block when the block is moved upwardly.

The rod 36 is moved downwardly with the block by means of a pin 42 mounted in the rod and projecting into a slot 43 in the block, the pin engaging the upper end of said slot as the block moves downwardly. The lower end of the block 38 is connected by a link 44 with a cam lever 46 pivoted on a shaft 48. The cam lever 46 carries a cam roll 50 arranged to engage the periphery of a cam disc 52 mounted on a cam shaft 54. The cam lever 46 is acted upon by a coiled spring 53 which normally holds the cam roll in contact with the periphery of cam disc 52 and causes a blade carried by the blade holder to be held yieldingly in contact with the honing roll when presented thereto. The cam shaft 54 is driven from the main driving shaft 10 through intermeshing spiral gears 56 and 58 carried respectively by the cam shaft and by the main driving shaft. Through the yielding connection between the rod 36 and the block 38, the carriage 28 is actuated yieldingly in a direction to carry the blade holder into blade receiving position. To enable the movement of the carriage 28 to be adjusted, the link 44 consists of a rod threaded at its ends respectively into yokes, as shown clearly in Fig. 1. Thus the movement of the carriage may be adjusted to compensate for the wearing down of the honing roll.

In the construction illustrated, the blade holder is reversed by rotating the shaft 18. This shaft preferably is rotated to reverse the blade holder by the movement of the carriage 28 as said carriage is actuated to swing the blade holder away from the honing roll. This makes for simplicity in the construction and mode of operation of the blade holder reversing mechanism. The mechanism for rotating the shaft 18 comprises a sleeve 60 loosely mounted on the lower end of the shaft 18, and a second sleeve 62 mounted to slide longitudinally on the sleeve 60 but connected to rotate therewith by means of a key 64. The sleeve 62 is connected with the shaft 18 by means of a friction clutch comprising a disc 66 secured to the lower end of the shaft, and a disc 68 preferably made of fibre, leather or other suitable friction material interposed between the disc 66 and the lower end of the sleeve 62. The sleeve 62 is acted upon by a coiled spring 69 which normally maintains the sleeve in engagement with the friction disc 68. The sleeve 60 carries at its upper end a bevel gear 70 meshing with a bevel gear 72 secured to a shaft 74 mounted to turn in a bearing in one of the trunnions 30, to the outer end of which shaft is secured a ratchet wheel 76.

When the blade holder carriage 28 is swung in a direction to carry the blade holder toward the honing wheel, the shaft 74 is turned with the carriage, by means of a pawl 78 pivoted at 80 on a projection on the arm 32 and engaging the ratchet wheel 76, the pawl being held in engagement with the ratchet wheel by a spring 82. When the blade holder carriage is swung in a direction to carry the blade holder away from the honing wheel, the shaft 74 is held from turning with the carriage by means of a pawl 84 pivoted at 86 on the frame and also arranged to engage the ratchet wheel, this pawl being held in engagement with the ratchet wheel by a spring 88. During this latter movement of the carriage through the gears 72 and 70, the sleeve 60, the sleeve 62, and the friction clutch connecting the sleeve 62 with the shaft 18, the shaft 18 is rotated to reverse the blade holder.

In the present form of the invention, when the blade holder is in position to engage a blade carried thereby with the honing roll, the friction clutch connecting the shaft 18 with the sleeve 62 is disengaged so that the shaft 18 can turn freely, allowing the blade carried by the blade holder to accommodate itself to the surface of the honing wheel. This friction clutch is preferably disengaged by the movement of the blade holder carriage as the carriage is actuated to carry the blade holder toward the honing wheel. To this end a bell-crank lever 90 (see Fig. 4) is pivoted at 92 on the carriage 28, and carries pins 94 (see Fig. 6) on one arm thereof, which engage in a groove in the sleeve 62. The other arm of the bell-crank lever is engaged by the inner end of a pin 98 mounted to slide in an opening in the carriage 28. As the carriage is swung in a direction to carry the blade holder toward the honing wheel, the outer end of the pin 98 is engaged by an adjustable abutment screw 100 threaded into the frame, and the bell-crank lever 90 is thereby actuated to slide the sleeve 62 upwardly on the sleeve 60, thus disengaging the lower end of the sleeve 62 from the friction disc 68. By the adjustment of the abutment screw 100, the point in the movement of the blade holder carriage at which the friction clutch is thrown out may be readily regulated.

Figure 1:
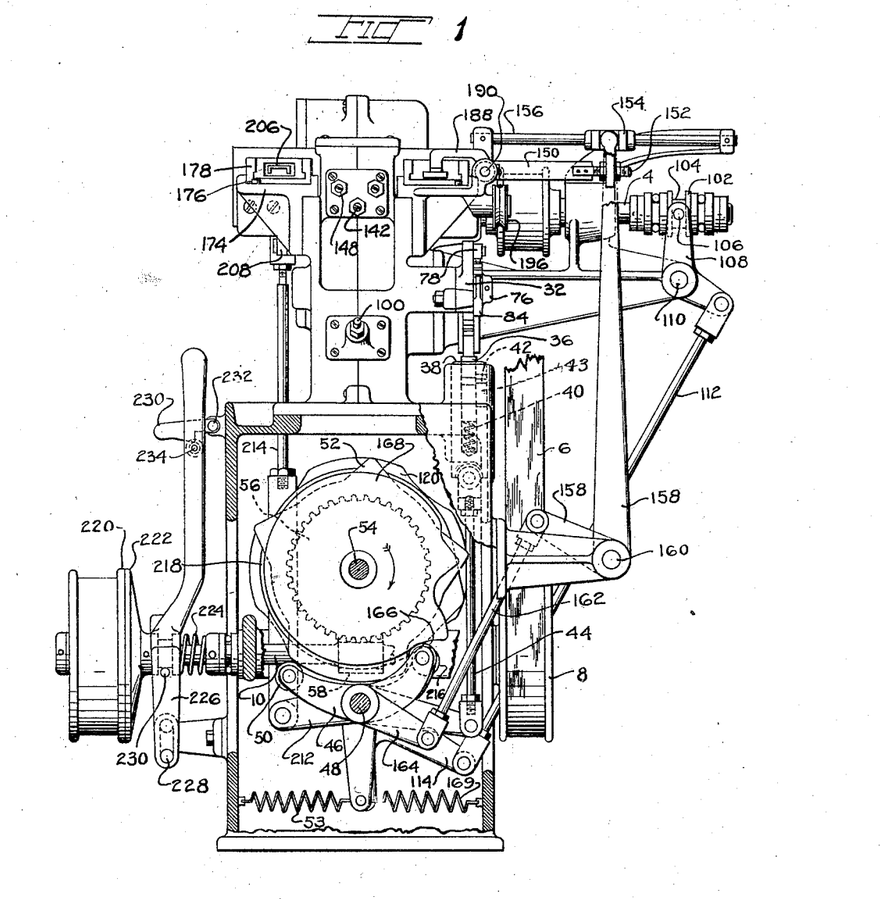
Fig. 1 is a view in front elevation of a machine embodying the invention.
Figure 2:
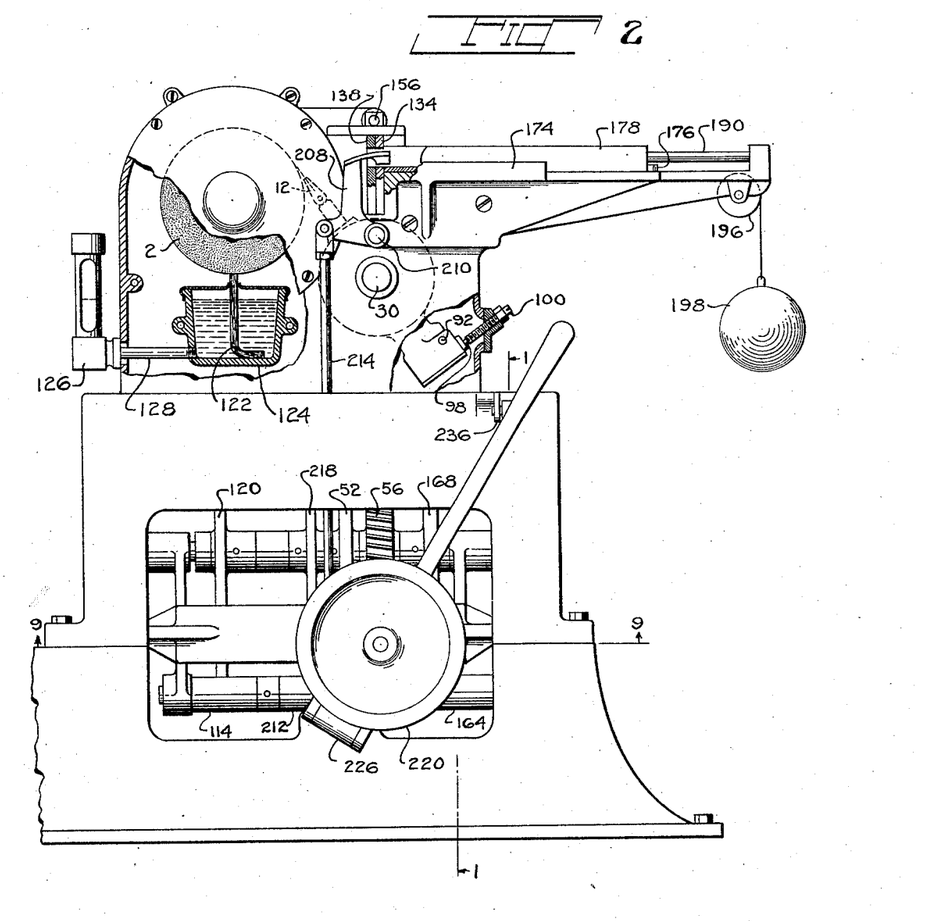
Fig. 2 is a view in side elevation of the machine, partly broken away and partly in section.
Figure 9:
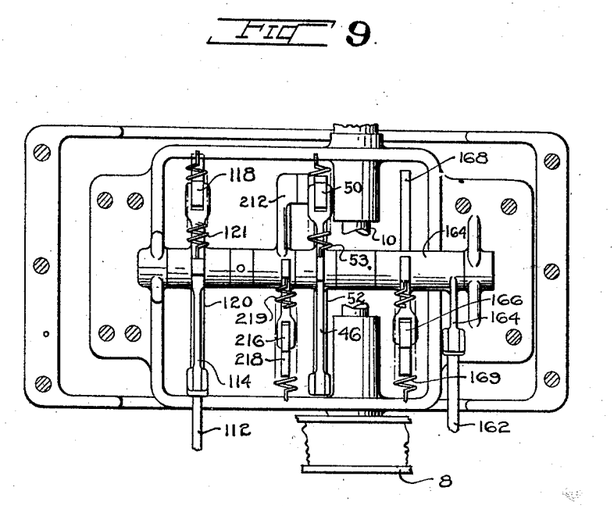
Fig. 9 is an under side plan view illustrating the cam shaft, cams and cam levers by which the principal operating parts of the machine are actuated.

While a blade is engaged with the honing wheel, the honing wheel is preferably moved axially or longitudinally of the cutting edge of the blade to shift the point of engagement of the blade with the wheel along the wheel. The honing wheel in the present machine is moved axially by moving the shaft 4, which carries the honing wheel longitudinally, this shaft being mounted for longitudinal as well as for rotary movement in its bearings in the frame. Upon the right hand end of the shaft, Fig. 1, is mounted a collar 102 having a central groove 104, in which are engaged pins 106 carried by one arm of a bell-crank lever 108 pivoted at 110 on an arm on the frame. The other arm of the bell-crank lever is connected by a link 112 with a cam lever 114 pivoted on the shaft 48 and carrying a cam roll 118 engaging the periphery of a cam disc 120 secured to the shaft 54. The cam lever is acted upon by a coiled spring 121 (see Fig. 9) attached to an arm on the lever which holds the cam roll 118 normally in engagement with the periphery of the cam disc 120. By the mechanism described, the shaft 4 is moved longitudinally in its bearings in timed relation to the movements of the blade holder carriage to shift the honing wheel axially while a blade is engaged with the wheel.

In the machine illustrated, oil or other suitable liquid is supplied to the surface of the honing wheel by means of a wick 122 mounted in the cover of a receptacle 124, the upper end of which wick engages the periphery of the honing wheel, and the lower end of which is immersed in the liquid in the receptacle. A gauge 126 is connected by a pipe 128 with the receptacle to show the level of the liquid therein.

The blades preferably are delivered in succession to the blade holder 12 from a blade guideway, and after the completion of the honing operation are carried from the blade holder into another similar guideway, these guideways being constructed for the passage of the blades edgewise therethrough. In the construction shown, the blades are delivered to the blade holder from a guideway 130 and are carried from the blade holder into a guideway 132. These guideways are formed by registering grooves in plates 134 and 138 (see Fig. 3) secured to the frame, and are constructed for the passage of the blades endwise therethrough, the guideways having a slightly greater thickness and width than the blades. The blades are delivered in succession to the guideway 130, and are carried from the guideway 132 preferably by movement of the blades in a direction transverse to the blade plane. To this end the right-hand plate 134, Fig. 3, is formed with an opening 135 through which the blades are delivered to the guideway 130, and the left-hand plate 134 is formed with an opening 140 through which the blades are carried from the guideway 132.

Figure 3:
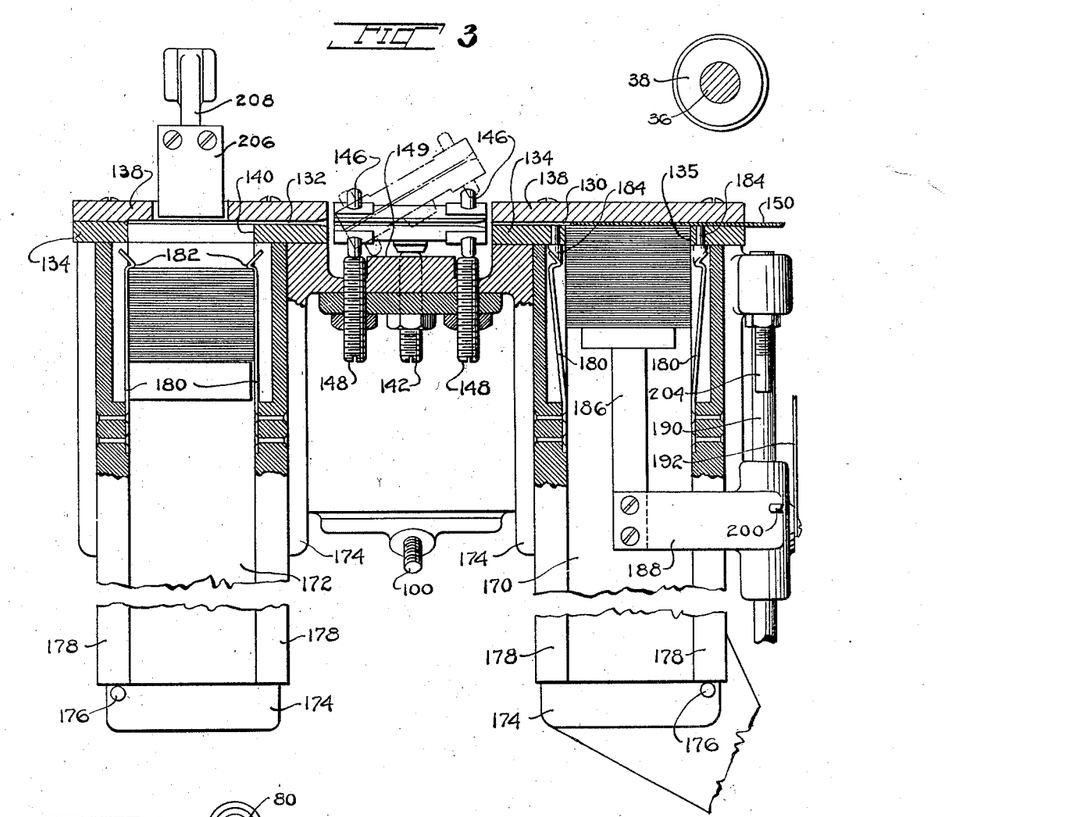
Fig. 3 is a view, partly in plan and partly in horizontal section, of a portion of the machine.
Figure 6:
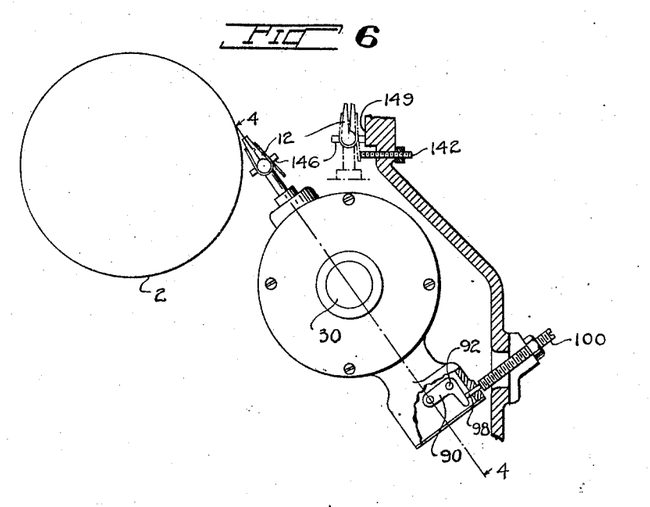
Fig. 6 is a view, partly in side elevation and partly in section, illustrating the movable blade holder and certain associated parts.
Figure 7:
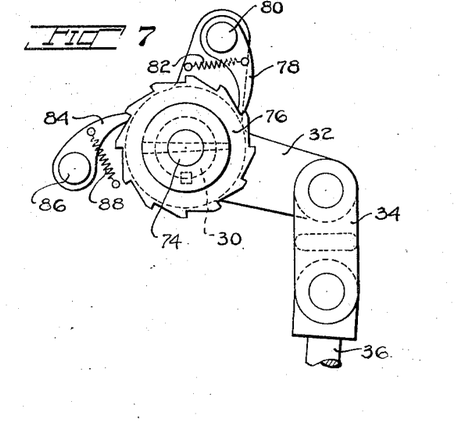
Fig. 7 is a view in side elevation illustrating certain parts of the mechanism for actuating the blade holder.

In the present machine the blade holder, after the completion of the honing operation on a blade, is swung by the movement of the blade holder carriage into a recess between the guideways 130 and 132 into position to deliver the honed blade to the guideway 132, and to receive another blade from the guideway 130 as shown in full lines in Fig. 3, this position being the same as that shown in dot and dash lines Fig. 6. To enable the blades easily to be removed from and inserted between the jaws of the blade holder, the jaws of the holder preferably are opened as the blade holder is swung into blade receiving and delivering position. As the blade holder is moved into blade receiving and delivering position, the movable jaw 20 of the blade holder is swung away from the fixed jaw 14 by the engagement of an abutment screw 142 threaded into the frame (see Fig. 6) with an arm 144 formed on the movable jaw 20. In order to line up the opening between the jaws of the blade holder with the guideways 130 and 132, the blade holder carries laterally projecting studs 146 arranged to engage adjustable abutment screws 148 threaded into the frame. The receiving end of the opening between the blade holding jaws and the receiving end of the guideway 132 are flared slightly to facilitate the insertion of the blades therein.

As the blade holder is swung into the recess between the guideways 130 and 132, the forward stud 146 at the left of the blade holder engages a contact surface 149 formed on a projection on the frame between the abutment screws 148 and wipes across the same as shown in Fig. 3, the blade holder being shown in dot and dash lines in this figure in the position which it occupies before its reversing movement is completed. The engagement of said stud with the contact surface 149 may assist in turning the blade holder in case the friction clutch connecting the shaft 18 with the sleeve 62 slips during the blade holder reversing action of the clutch. The throw of the cam lever 46 in a direction to carry the blade holder into the recess between the guideways 130 and 132 is more than sufficient to engage the studs 146 with the abutment screws 148, this excess in the movement of the cam lever being taken up by the spring 40. Thus the studs 46 are brought firmly into engagement with the abutment screws 148, and the proper lining-up of the blade holder with relation to the guideways 130 and 132 is ensured, the friction clutch connecting the shaft 18 with the sleeve 62, allowing the shaft to turn relatively to the sleeve, if necessary, in lining up the blade holder.

In the present machine the blades are carried in succession from the guideway 130 into the opening between the blade gripping jaws, and after the completion of the operation thereon are carried from the blade holder into the guideway 132 by means of a slide 150 mounted to reciprocate in the guideway 130 so as to engage the ends of the blades as they are carried successively through the opening 135 into said guideway. Before starting its operative movement, the slide 150 is retracted to the right of the opening 135, Fig. 3. The slide is actuated to advance the same to the left from this position and thereby force a blade from the guideway 130 into the blade holder, and is then retracted slightly while the blade holder is actuated to present the blade to the honing wheel. When the blade holder is returned to its initial position, the slide 150 is again advanced to push the blade from the blade holder into the guideway 132 and is then retracted to its starting position. The outer end of the slide 150 carries a threaded rod 152 (see Fig. 1) adjustably secured in a projection on a block 154 mounted to slide longitudinally on a rod 156 supported at its ends in a frame. The movements above described are imparted to the slide 150 by the actuation of the block 154. The mechanism for actuating the block comprises a bell-crank lever 158 pivoted at 160 on an arm on the frame, the upwardly extending arm of which lever engages between projections on the block 154. The laterally extending arm of the lever is connected by a link 162 with one arm of a cam lever 164 pivoted on the shaft 48. The other arm of the cam lever 164 carries a cam roll 166 engaging the periphery of a cam disc 168 secured to the shaft 54. The cam lever 164 is acted upon by a coiled spring 169 attached to an arm on the lever which normally holds the cam roll 166 in contact with the periphery of cam disc 168.

The blades to be operated upon are preferably brought to the machine in a portable galley adapted to receive a pack of blades, and are preferably delivered after the completion of an operation into a similar portable galley.

The blades, in the present machine, are delivered successively through the opening 135 to the guideway 130 from a supply galley 170 (see Fig. 3) and are carried from the guideway 132 through the opening 140 into a receiving galley 172. These galleys are preferably identical in construction and are removably mounted in the machine so that they may be transferred from one machine to another of a series of machines for performing different operations upon the blades, the receiving galley of one machine after being filled with blades constituting the supply galley of the next machine and vice versa. The galleys are mounted in grooves in brackets 174 secured to the frame and are located between the plates 134 and pins 176 secured in the brackets. The galleys are provided with a central guideway formed by marginal ribs 178 adapted to receive a series or pack of blades placed face to face between said ribs, as clearly shown in Fig. 3. Preferably the devices for locating the galleys are constructed and arranged so that when the galleys are placed in the machine the guideways therein are located substantially perpendicular to the guideways 130 and 132. Each galley carries at one end spring retaining pawls 180 having shoulders 182 adapted to extend over the ends of the last blade at one end of the pack in the galley and thus hold the pack in position.

To enable the blades to be delivered freely from the supply galley, the right-hand plate 134 is provided with beveled pins 184 arranged to engage the beveled ends of the retaining pawls as the galley is placed in operating position and force the ends of the pawls back out of retaining position, as shown in Fig. 3. The blades are forced along the supply galley by a movement substantially normal to the blade plane to carry the same successively into the guideway 130 by means of an arm 186 secured to a block 188 and arranged to engage the forward blade of the pack in the supply galley. The block 188 is mounted to slide longitudinally on a rod 190 supported at its ends in the frame, and to the block is attached one end of a cable 192 passing about guide pulleys 194 and 196 (see Figs. 2 and 8), and having a weight 198 secured to the other end thereof. The weight 198 tends constantly to carry the block 188 and the arm 186 toward the rear of the supply galley 170, and the pack of blades is thus carried along the galley as the blades are pushed successively from the guideway 130 into the blade holder 12.

Figure 8:
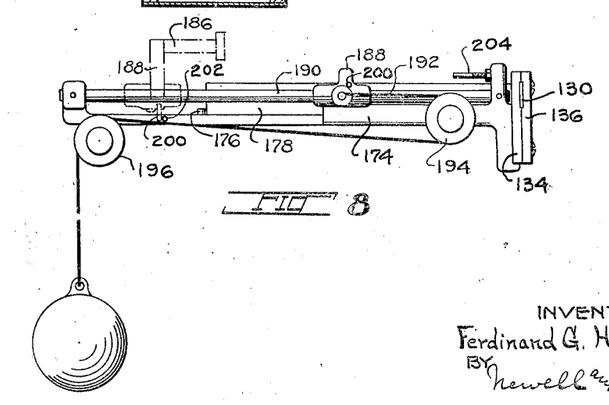
Fig. 8 is a detail view in side elevation illustrating particularly the mechanism for moving the blades along the supply galley.

To enable the supply galleys readily to be inserted in and removed from the machine, the block 188 is mounted on the rod 190 so that it may be turned upwardly into the position shown in dot and dash lines in Fig. 8, and the block carries a pin 200 arranged to engage a pin 202 on the frame to hold the block in this position. The rearward movement of the block 188 is limited by an abutment screw 204.

The retaining pawls 180 of the receiving galley are allowed to remain in their normal positions during the operation of the machine, and each blade after it is moved through the guideway 132 into registration with the opening 140 is pushed from the guideway through said opening into the receiving galley by a movement in a direction substantially normal to the blade plane. During this movement of the blade, the ends of the blade engage the beveled ends of the retaining pawls and force the same back and the blade is finally carried past the shoulders on the pawls into position to be held by the pawls. This movement is imparted to the blades by means of a pusher 206 (see Fig. 3) secured to an arm on a lever 208 (see Fig. 2) pivoted at 210 on the frame which is oscillated to impart the required movements to the pusher. The mechanism for actuating the lever comprises a cam lever 212 and a two-part link 214 connecting the cam lever with the lever 208. The cam lever 212 carries a cam roll 216 arranged to engage the periphery of a cam disc 218 secured to the shaft 54. The cam lever 212 is acted upon by a coiled spring 219 (see Fig. 9) attached to an arm on said lever which normally holds the cam roll 216 in contact with the periphery of cam disc 218. The length of the link 214 may be adjusted to adjust the movement of the lever 208. To this end the upper part of said link consists of a rod threaded at its upper end into a yoke, and at its lower end into the lower part of said link as shown in Fig. 1.

The main driving shaft 10 of the present machine is arranged to be driven through a friction clutch comprising driving and driven clutch members 220 and 222 mounted on the shaft. The driving clutch member 220 consists of a pulley loosely mounted on the shaft and adapted to receive a suitable driving belt. The driven clutch member 222 consists of a disc secured to rotate with the shaft 10 but movable longitudinally of the shaft to carry the same into and out of engagement with the clutch member 220. The clutch member 222 is acted upon by a coiled spring 224 which normally holds the same in engagement with the clutch member 220. The clutch member 222 is moved longitudinally on the shaft 10 to disengage the same from the clutch member 220 by means of a lever 226 pivoted at 228 on the frame and carrying a pin 230 which engages in a groove in the hub of the clutch member 222. To hold the clutch member 222 out of engagement with the clutch member 220, a latch 230 is pivoted at 232 on the frame and is arranged to engage a pin 234 secured in the lever 226.

It will be understood that except as defined in the claims, the invention is not limited to the particular construction and arrangement of parts of the illustrated embodiment of the invention but that the invention may be embodied in other forms within the scope of the claims.

Having explained the nature and object of the invention, and having specifically described a machine embodying the various features of the invention in their preferred forms, what is claimed is:

1. A machine of the class described, having in combination blade sharpening means, an oscillating blade holder having blade gripping jaws arranged to engage opposite lateral faces of the blades for presenting the blades to the blade sharpening means, a blade holder carriage, automatic means for oscillating the carriage to oscillate the blade holder, and means controlled by the movement imparted by said means to the carriage for opening and closing the blade gripping jaws.

2. A machine of the class described, having in combination blade sharpening means, a blade holder having blade gripping jaws for engaging opposite lateral faces of the blades, a guideway through which the blades are delivered to the blade holder, means for moving the blade holder into position to receive the blades from said guideway, and means for opening and closing the blade gripping jaws.

3. A machine of the class described, having in combination blade sharpening means, a blade holder having blade gripping jaws, a guideway through which the blades are delivered to the blade holder, a guideway into which the blades are delivered from the blade holder, means for moving the blade holder into position to receive the blades from the first guideway and to deliver the same to the second guideway, and means for opening and closing the blade gripping jaws.

4. A machine of the class described, having in combination blade sharpening means, a blade holder having blade gripping jaws, a guideway into which the blades are delivered from the blade holder, means for moving the blade holder into position to deliver the blades to said guideway, and means for opening and closing the blade gripping jaws.

5. A machine of the class described, having in combination blade sharpening means, a movable blade holder for presenting blades to the blade sharpening means adapted to receive blades when dwelling in a position relatively remote from the blade sharpening means, and means for moving the blade holder from this position to carry a blade into engagement with the blade sharpening means, for actuating and controlling the blade holder to present each side of a blade a plurality of times to the blade sharpening means, the blade holder being reversed after each presentation, and for moving the blade holder away from the blade sharpening means after the completion of the sharpening operation and causing a dwell in the movement thereof for the insertion and removal of blades during the continued operation of the machine.

6. A machine of the class described, having in combination blade sharpening means, an oscillatory blade holder carriage, a shaft mounted in said carriage to rotate on an axis substantially parallel with the plane of oscillation of the carriage, a blade holder mounted on said shaft, means for oscillating the carriage to carry the blade holder toward and from the blade sharpening means, and means for rotating the shaft to reverse the blade holder during the movement of the carriage in one direction, comprising a member mounted to rotate about the axis of oscillation of the carriage, gearing connecting said member and the shaft, and mechanism for rotating said member with the carriage during the movement of the carriage in one direction and for holding said member stationary during the movement of the carriage in the opposite direction.

7. A machine of the class described, having in combination blade sharpening means, an oscillating blade holder carriage, a shaft mounted in the carriage to rotate on an axis substantially parallel with the plane of oscillation of the carriage, means for oscillating the carriage to carry the blade holder toward and from the blade sharpening means, and means for rotating the shaft to reverse the blade holder during the movement of the carriage in one direction, comprising a bevel gear mounted upon the shaft, a connection between the gear and shaft for rotating the shaft with the gear, a bevel gear mounted to rotate about the axis of oscillation of the carriage and meshing with said first gear, and ratchet and pawl mechanism for rotating the second gear with the carriage during the movement of the carriage in one direction, and for holding the latter gear stationary during the movement of the carriage in the opposite direction.

8. A machine of the class described, having in combination blade sharpening means, an oscillating blade holder carriage, a blade holder rotatably mounted on the carriage, means for oscillating the carriage to carry the blade holder toward and from the blade sharpening means, and means for rotating the blade holder to reverse the same during the movement of the carriage in one direction comprising a rotatable member, gearing connecting said member with the blade holder, means for rotating said member with the carriage during the movement of the carriage in one direction, and means for holding said member stationary during the movement of the carriage in the opposite direction and thereby cause a rotary reversing movement to be imparted to the blade holder.

9. A machine of the class described, having in combination blade sharpening means, a blade holder carriage, a blade holder reversibly mounted on the carriage, means for moving the carriage to carry the blade holder toward and from the blade sharpening means, means comprising a clutch for reversing the blade holder, and means for disengaging the clutch as the blade holder is carried toward the blade sharpening means.

10. A machine of the class described, having in combination blade sharpening means, a blade holder carriage, a blade holder reversibly mounted on the carriage, means for moving the carriage to carry the blade holder toward and from the blade sharpening means, means comprising a clutch for reversing the blade holder, and means operated by the movement of the carriage for disengaging the clutch.

11. A machine of the class described, having in combination blade sharpening means, a blade guideway, an angularly movable blade holder, means for moving the blade holder transversely of the guideway from and toward a position in line with said guideway to carry the blade holder toward and from the blade sharpening means, and stop means for engaging the blade holder to align the blade holder angularly with said guideway.

12. A machine of the class described, having in combination a blade sharpening means having a blade engaging surface, a blade holder having gripping jaws, means for supporting said blade holder to permit movement thereof transversely of the said surface and about a fixed axis, automatic means for moving the said blade holder about the said fixed axis to carry the blade into and out of contact with the said surface, means for limiting the movement of the said blade holding means away from the said surface, and a fixed stop adapted to engage the said blade holder and to open the jaws thereof during the transverse movement of the said holder away from the said surface.

13. A machine of the class described, having in combination blade sharpening means, a blade guideway, a movable blade holder, means for moving the blade holder to carry a blade toward and from the blade sharpening means, means comprising a friction clutch for reversing the blade holder, and stop means for engaging the blade holder to align the same with said guideway.

14. A machine of the class described, having in combination blade sharpening means, a blade guideway, a movable blade holder, means for moving the blade holder to carry a blade toward and from the blade sharpening means, means comprising a friction clutch for reversing the blade holder, means for causing the disengagement of the clutch while a blade is engaged with the blade sharpening means, and stop means for engaging the blade holder to align the same with said guideway.

15. A machine for operating on blades having, in combination, a blade guideway, a blade holder movable transversely of the guideway from and toward a position in line therewith, means for operating on blades located at one side of said guideway, and means for moving the blade holder transversely of the guideway in one direction only from a position in line with the guideway to present blades to the operating means and for moving the blade holder back to said position after the completion of the operation.

16. A machine for operating on blades, having in combination a blade guideway, a blade holder movable transversely of the guideway from and toward a position in line therewith, means for operating on blades located at one side of said guideway and means for moving the blade holder in one direction only transversely of the guideway from a position in line with the guideway to carry blades into engagement with the operating means, for actuating and controlling the blade holder to present each blade a plurality of times to the operating means, the blade holder being reversed after each presentation, and for moving the blade holder back to said position after the completion of the operation.

17. A machine for operating on blades having, in combination, a blade guideway, a second blade guideway in alignment with said first guideway and spaced therefrom, means for operating on blades located at one side of said guideways, a movable blade holder arranged when in a position in line with said guideways to receive the blades from said first guideway and to discharge blades into the second guideway, means for transferring blades from the first guideway to the blade holder and from the blade holder to the second guideway when the blade holder is located in said position, and means for moving the blade holder in one direction only from said position to present blades to the operating means and for moving the blade holder back to said position after the completion of the operation.

18. A machine for operating on blades having, in combination, a blade guideway, means for operating on blades, a blade holder angularly movable to allow a blade to conform to the blade sharpening means during its engagement therewith and means for aligning the blade holder with the guideway.

Signed at Jersey City, N. J., this 21st day of August, 1920.

FERDINAND G. HENRY.

Witnesses:
GEORGE WHITE,
MICHAEL J. KING.